United States Patent
Butler et al.

(10) Patent No.: US 10,223,858 B2
(45) Date of Patent: Mar. 5, 2019

(54) SYSTEMS AND METHODS MONITORING DEVICES, SYSTEMS, USERS AND USER ACTIVITY AT REMOTE LOCATIONS

(75) Inventors: Jon F. Butler, Salt Lake City, UT (US); Mark W. Nakada, Salt Lake City, UT (US)

(73) Assignee: MEDIAPORT ENTERTAINMENT, INC., Salt Lake City, UT (US)

( * ) Notice: Subject to any disclaimer, the term of this patent is extended or adjusted under 35 U.S.C. 154(b) by 0 days.

(21) Appl. No.: 12/168,109

(22) Filed: Jul. 5, 2008

(65) Prior Publication Data
US 2009/0166375 A1 Jul. 2, 2009

Related U.S. Application Data

(60) Provisional application No. 60/948,116, filed on Jul. 5, 2007.

(51) Int. Cl.
| | |
|---|---|
| *B65D 83/00* | (2006.01) |
| *G07F 17/26* | (2006.01) |
| *G06Q 20/12* | (2012.01) |
| *G06Q 20/20* | (2012.01) |
| *G06Q 20/32* | (2012.01) |
| *G07F 17/00* | (2006.01) |
| *G06Q 20/18* | (2012.01) |

(52) U.S. Cl.
CPC ........... *G07F 17/26* (2013.01); *G06Q 20/123* (2013.01); *G06Q 20/18* (2013.01); *G06Q 20/20* (2013.01); *G06Q 20/322* (2013.01); *G07F 17/0014* (2013.01)

(58) Field of Classification Search
CPC ... G07F 17/26; G07F 17/0014; G06Q 20/123; G06Q 20/322; G06Q 20/18
USPC ........................................................ 700/233
See application file for complete search history.

(56) References Cited

U.S. PATENT DOCUMENTS

| | | |
|---|---|---|
| RE30,037 E | 6/1979 | Bass |
| 4,412,292 A | 10/1983 | Sedam et al. |
| 4,528,643 A | 7/1985 | Freeny, Jr. |

(Continued)

FOREIGN PATENT DOCUMENTS

| | | |
|---|---|---|
| WO | PCT0765930 | 4/2007 |
| WO | PCT/US07/65930 | 4/2007 |

OTHER PUBLICATIONS

U.S. Appl. No. 11/773,540, filed Jul. 5, 2007, Butler.

*Primary Examiner* — Michael Collins
(74) *Attorney, Agent, or Firm* — Loza & Loza, LLP; Tyler J. Barrett (57) ABSTRACT

Apparatus for vending physical products and/or digital content and methods of using such apparatus are described. In some embodiments, a traditional vending machine, such as a beverage vending machine, can be equipped with an electronic transfer device and a user or customer interface to allow the customer to select the desired digital content such that a consumer can download the content onto a user's portable electronic device, such as a mobile phone, handheld computer, or other media-playback device. In other embodiments, a vending machine can vend a portable electronic product after it has been loaded with the digital content selected by the user. In other embodiments, a vending machine could vend a customized CD or DVD containing the digital content selected by the consumer. Other embodiments are described.

2 Claims, 3 Drawing Sheets

(56) References Cited

U.S. PATENT DOCUMENTS

| | | | |
|---|---|---|---|
| 4,646,234 A | 2/1987 | Tolman | |
| 4,674,055 A | 6/1987 | Ogaki et al. | |
| 4,796,220 A | 1/1989 | Wolfe | |
| 5,237,157 A | 8/1993 | Kaplan | |
| 5,307,354 A | 4/1994 | Cramer et al. | |
| 5,418,713 A | 5/1995 | Allen | |
| 5,445,295 A | 8/1995 | Brown | |
| 5,530,235 A | 6/1996 | Stefik | |
| 5,629,980 A | 5/1997 | Stefik | |
| 5,634,012 A | 5/1997 | Stefik | |
| 5,638,443 A | 6/1997 | Stefik | |
| 5,675,645 A | 10/1997 | Schwartz et al. | |
| 5,715,403 A | 2/1998 | Stefik | |
| 5,734,719 A | 3/1998 | Tsevdos et al. | |
| 5,768,142 A | 6/1998 | Jacobs | |
| 5,794,217 A | 8/1998 | Allen | |
| 5,809,298 A | 9/1998 | Nakada | |
| 5,822,216 A * | 10/1998 | Satchell et al. | 700/232 |
| 5,848,398 A | 12/1998 | Martin et al. | |
| 5,875,110 A | 2/1999 | Jacobs | |
| 5,892,900 A | 4/1999 | Ginter et al. | |
| 5,903,647 A | 5/1999 | Ronning | |
| 5,959,945 A | 9/1999 | Kleiman | |
| 5,978,775 A | 11/1999 | Chen | |
| 5,991,735 A | 11/1999 | Gerace | |
| 6,016,520 A | 1/2000 | Facq et al. | |
| 6,078,928 A | 6/2000 | Schnase | |
| 6,115,649 A | 9/2000 | Sakata | |
| 6,125,388 A | 9/2000 | Reisman | |
| 6,145,102 A | 11/2000 | Klein et al. | |
| 6,223,089 B1 | 4/2001 | Page | |
| 6,226,618 B1 | 5/2001 | Downs et al. | |
| 6,286,029 B1 | 9/2001 | Delph | |
| 6,289,455 B1 | 9/2001 | Kocher et al. | |
| 6,292,786 B1 | 9/2001 | Deaton | |
| 6,308,887 B1 | 10/2001 | Korman et al. | |
| 6,318,536 B1 | 11/2001 | Korman et al. | |
| 6,323,894 B1 | 11/2001 | Katz | |
| 6,330,490 B1 | 12/2001 | Kim et al. | |
| 6,334,110 B1 | 12/2001 | Walter et al. | |
| 6,381,575 B1 | 4/2002 | Martin et al. | |
| 6,397,189 B1 | 5/2002 | Martin et al. | |
| 6,519,571 B1 | 2/2003 | Guheen | |
| 6,535,791 B1 | 3/2003 | Wang | |
| 6,570,080 B1 | 5/2003 | Hasegawa | |
| 6,571,150 B2 * | 5/2003 | Arai | G07F 5/18 700/234 |
| 6,571,279 B1 | 5/2003 | Herz | |
| 6,577,735 B1 | 6/2003 | Bharat | |
| 6,594,548 B2 * | 7/2003 | Bagnordi | 700/233 |
| 6,606,602 B1 | 8/2003 | Kolls | |
| 6,651,190 B1 | 11/2003 | Worley et al. | |
| 6,654,757 B1 | 11/2003 | Stern | |
| 6,655,580 B1 | 12/2003 | Ergo et al. | |
| 6,658,464 B2 | 12/2003 | Reisman | |
| 6,662,080 B2 | 12/2003 | Wakai et al. | |
| 6,691,229 B1 | 2/2004 | Nelson | |
| 6,697,962 B1 | 2/2004 | McCrory et al. | |
| 6,711,464 B1 | 3/2004 | Yap et al. | |
| 6,738,906 B1 | 5/2004 | Hippelainen | |
| 6,748,360 B2 | 6/2004 | Pitman | |
| 6,748,537 B2 | 6/2004 | Hughes | |
| 6,748,539 B1 | 6/2004 | Lotspiech | |
| 6,754,558 B2 | 6/2004 | Preston | |
| 6,757,850 B1 | 6/2004 | Lehner | |
| 6,769,061 B1 | 7/2004 | Ahern | |
| 6,785,704 B1 | 8/2004 | McCanne | |
| 6,799,165 B1 | 9/2004 | Boesjes | |
| 6,807,532 B1 | 10/2004 | Kolls | |
| 6,813,733 B1 | 11/2004 | Li et al. | |
| 6,830,160 B2 | 12/2004 | Risolia | |
| 6,832,318 B1 | 12/2004 | Yaegashi | |
| 6,832,319 B1 | 12/2004 | Bell | |
| 6,839,597 B2 | 1/2005 | Hattori et al. | |
| 6,853,985 B1 | 2/2005 | Yamashita et al. | |
| 6,854,645 B1 | 2/2005 | Sommers, Jr. et al. | |
| 6,860,429 B2 | 3/2005 | Stebbings et al. | |
| 6,865,551 B1 | 3/2005 | Stefik | |
| 6,865,555 B2 | 3/2005 | Novak | |
| 6,865,676 B1 | 3/2005 | Staring et al. | |
| 6,873,710 B1 | 3/2005 | Cohen-Solal | |
| 6,876,901 B2 | 4/2005 | DiLorenzo | |
| 6,882,269 B2 | 4/2005 | Moreno | |
| 6,895,285 B2 | 5/2005 | Maity | |
| 6,904,458 B1 | 6/2005 | Bishop et al. | |
| 6,931,419 B1 | 8/2005 | Lindquist | |
| 6,976,009 B2 | 12/2005 | Tadayon | |
| 7,024,466 B2 | 4/2006 | Outten | |
| 7,054,834 B2 | 5/2006 | Hatakeyama | |
| 7,054,840 B1 | 5/2006 | Foth | |
| 7,058,720 B1 | 6/2006 | Majdimehr | |
| 7,062,469 B2 | 6/2006 | Meyers | |
| 7,062,510 B1 | 6/2006 | Eldering | |
| 7,218,991 B2 * | 5/2007 | Walker | G06Q 20/10 700/232 |
| 7,237,125 B2 | 6/2007 | Raley et al. | |
| 7,260,624 B2 | 8/2007 | Sivertsen | |
| 7,263,632 B2 | 8/2007 | Ritz | |
| 7,302,465 B2 | 11/2007 | Ayres et al. | |
| 7,346,583 B2 | 3/2008 | Hicks et al. | |
| 7,356,771 B2 | 4/2008 | Paul et al. | |
| 7,577,496 B2 * | 8/2009 | Walker et al. | 700/236 |
| 7,603,321 B2 | 10/2009 | Gurvey | |
| 7,660,767 B1 * | 2/2010 | Schultz | G06Q 20/1085 235/379 |
| 7,747,346 B2 | 6/2010 | Lowe et al. | |
| RE41,543 E * | 8/2010 | Satchell et al. | 700/232 |
| 7,826,923 B2 * | 11/2010 | Walker | G06Q 20/20 700/236 |
| 7,912,581 B2 * | 3/2011 | Walker et al. | 700/240 |
| 8,191,779 B2 * | 6/2012 | Illingworth et al. | 235/381 |
| 2001/0056405 A1 | 12/2001 | Muyres | |
| 2002/0046122 A1 * | 4/2002 | Barber et al. | 705/17 |
| 2002/0075149 A1 | 6/2002 | Goodwin | |
| 2002/0078441 A1 | 6/2002 | Drake | |
| 2002/0107610 A1 * | 8/2002 | Kaehler et al. | 700/232 |
| 2002/0161476 A1 * | 10/2002 | Panofsky | G06Q 10/087 700/231 |
| 2002/0184517 A1 | 12/2002 | Tadayon et al. | |
| 2003/0028451 A1 | 2/2003 | Ananian | |
| 2003/0040838 A1 * | 2/2003 | Lagunzad | G06Q 20/12 700/232 |
| 2003/0061271 A1 | 3/2003 | Pittarelli | |
| 2003/0132287 A1 | 7/2003 | Harris | |
| 2003/0196121 A1 | 10/2003 | Raley et al. | |
| 2003/0217306 A1 | 11/2003 | Harthcock | |
| 2003/0229406 A1 | 12/2003 | Mait | |
| 2003/0229797 A1 | 12/2003 | Newman | |
| 2004/0024727 A1 | 2/2004 | Bowman | |
| 2004/0059782 A1 | 3/2004 | Sivertsen | |
| 2004/0098740 A1 | 5/2004 | Maritzen et al. | |
| 2004/0162633 A1 * | 8/2004 | Kraft | G07F 11/24 700/234 |
| 2004/0163008 A1 | 8/2004 | Kim | |
| 2004/0213408 A1 | 10/2004 | Kim et al. | |
| 2004/0225381 A1 | 11/2004 | Ritz et al. | |
| 2004/0254676 A1 * | 12/2004 | Blust et al. | 700/231 |
| 2005/0010805 A1 | 1/2005 | Jascau et al. | |
| 2005/0021948 A1 | 1/2005 | Kamperman | |
| 2005/0021995 A1 | 1/2005 | Lal et al. | |
| 2005/0039000 A1 | 2/2005 | Erickson | |
| 2005/0044016 A1 | 2/2005 | Irwin | |
| 2005/0049931 A1 * | 3/2005 | Wisnudel et al. | 705/26 |
| 2005/0071663 A1 | 3/2005 | Medvinski | |
| 2005/0071669 A1 | 3/2005 | Medvinsky | |
| 2005/0086326 A1 | 4/2005 | Manning et al. | |
| 2005/0096936 A1 | 5/2005 | Lambers | |
| 2005/0097182 A1 | 5/2005 | Bishop | |
| 2005/0102191 A1 | 5/2005 | Heller | |
| 2005/0109842 A1 * | 5/2005 | Walker | G06Q 20/10 235/381 |
| 2005/0120212 A1 | 6/2005 | Kanungo et al. | |
| 2005/0138406 A1 | 6/2005 | Cox | |
| 2005/0188424 A1 | 8/2005 | Kizyma | |

(56) References Cited

U.S. PATENT DOCUMENTS

| | | |
|---|---|---|
| 2005/0192820 A1 | 9/2005 | Simon et al. |
| 2005/0216415 A1 | 9/2005 | Stefik et al. |
| 2005/0267845 A1 | 12/2005 | Oh et al. |
| 2005/0271205 A1 | 12/2005 | Shen et al. |
| 2005/0273862 A1 | 12/2005 | Benaloh et al. |
| 2005/0276570 A1 | 12/2005 | Reed et al. |
| 2005/0278716 A1 | 12/2005 | Koppen et al. |
| 2005/0289338 A1 | 12/2005 | Stadlman |
| 2006/0020557 A1 | 1/2006 | Nixon |
| 2006/0026265 A1 | 2/2006 | Russell |
| 2006/0026691 A1 | 2/2006 | Kim et al. |
| 2006/0080275 A1* | 4/2006 | Christal ............... G06Q 30/06 |
| 2006/0092284 A1 | 5/2006 | Goodman |
| 2006/0107330 A1 | 5/2006 | Ben-Yaacov |
| 2006/0190345 A1* | 8/2006 | Crowley ...................... 705/26 |
| 2006/0224517 A1 | 10/2006 | Shimpi et al. |
| 2006/0247824 A1* | 11/2006 | Walker et al. ............... 700/241 |
| 2006/0249576 A1 | 11/2006 | Nakada et al. |
| 2006/0265280 A1 | 11/2006 | Nakada et al. |
| 2006/0287913 A1 | 12/2006 | Baluja |
| 2007/0050083 A1* | 3/2007 | Signorelli ............. G06Q 20/20 700/241 |
| 2007/0088659 A1 | 4/2007 | Phillips |
| 2007/0156443 A1 | 7/2007 | Gurvey |
| 2007/0192438 A1 | 8/2007 | Goei |
| 2007/0233601 A1 | 10/2007 | Nakada et al. |
| 2007/0260551 A1 | 11/2007 | Eckleder |
| 2008/0004748 A1 | 1/2008 | Butler et al. |
| 2008/0084293 A1 | 4/2008 | Adelbert |
| 2008/0172243 A1 | 7/2008 | Kelly |
| 2008/0255870 A1 | 10/2008 | Butler |
| 2008/0288106 A1* | 11/2008 | Widergren ............. G06F 21/10 700/234 |
| 2009/0006900 A1 | 1/2009 | Lastras-Montano et al. |
| 2009/0012873 A1 | 1/2009 | Hamling et al. |
| 2009/0053992 A1 | 2/2009 | Butler |
| 2009/0076832 A1 | 3/2009 | Collins |
| 2010/0127013 A1 | 5/2010 | Butler |
| 2010/0169652 A1 | 7/2010 | Butler |
| 2010/0174655 A1 | 7/2010 | Butler et al. |
| 2010/0211217 A1* | 8/2010 | Hirsh .................. G06Q 20/123 700/234 |
| 2014/0309770 A1* | 10/2014 | Signorelli ............. G06Q 20/20 700/232 |

\* cited by examiner

SYSTEMS AND METHODS MONITORING DEVICES, SYSTEMS, USERS AND USER ACTIVITY AT REMOTE LOCATIONS

CROSS-REFERENCE TO RELATED APPLICATIONS

This patent application claims priority of U.S. Provisional Application Ser. No. 60/948,116, filed Jul. 5, 2007, the entire disclosure of which is hereby incorporated by reference.

FIELD

This application relates generally to apparatus for vending products and digital media. In particular, this application relates to apparatus for vending digital content and/or physical products from a vending location and systems containing such apparatus.

BACKGROUND

As society continues to advance, media is available in ever-changing formats. For example, services exist that provide media, including entire movies, television shows, music albums, individual songs, audio books on tape, books and magazines, and even recorded blogs in an electronic format without the transfer of a recordable media, such as on a CD or DVD, from a vendor to consumer. Similarly, media playback devices such as portable DVD and CD players, handheld media devices for playing music and video, handheld computers, portable telephones, and other electronic devices allow individuals to carry virtually any media to virtually anywhere. Because of the proliferation of media formats and availability, consumers desire media more quickly and in a variety of formats to suit their individual preferences. Because such content is stored digitally, it can be transferred using many types of electronic networks. See, for example, U.S. Pat. Nos. 5,875,110, 4,412,292, 5,848, 398, 6,397,189, 6,381,575, 4,674,055, 5,445,295, 5,734,719, 6,286,029, 6,799,165, 6,655,580, 6,330,490, 6,662,080, 6,535,791, 6,711,464, 5,237,157, 6,654,757, 5,794,217, and 6,748,539. Both private and public electronic networks, including the internet, are frequently used to transfer the digital content.

Often the digital content is transferred electronically so that it can be sold to a user who is not located where the digital content is originally stored. The digital content can be sold for a variety of purposes, including education, entertainment, research, or other purposes. The digital content may be sold in any number of technological formats known in the art that permit storage and retrieval of the digital data, including floppy discs, compact discs (CDs) of several varieties; video discs of several varieties, including digital video discs (DVDs); magnetic storage devices using a variety of forms and technologies; and solid state devices of several varieties.

Most digital content sales have been to users of computers that are connected to each other via electronic networks of various types, e.g., the internet. However users are not always located at such a computer when they desire to purchase the digital content, or they have a computer but it is not connected to such a network. Consequently, sales (including rentals) of digital content have begun using devices in remote locations, including stand-alone devices (such as vending machine s) in retail or other high-traffic areas. The stand-alone devices may be attended or unattended.

Traditional vending machines are also used as stand-alone devices. Vending machines typically provide physical products, usually food and beverage products, in convenient locations where such products would be in demand but wouldn't be an appropriate or profitable location for a traditional store. However, traditional vending machines have often been limited to just vending physical products.

SUMMARY

This application describes an apparatus for vending physical products and/or digital content and methods of using such apparatus. In some embodiments, a traditional vending machine, such as a beverage vending machine, can be equipped with an electronic transfer device and a user or customer interface to allow the customer to select the desired digital content such that a consumer can download the content onto a user's portable electronic device, such as a mobile phone, hand-held computer, or other media-playback device. In other embodiments, a vending machine can vend a portable electronic product after it has been loaded with the digital content selected by the user. In other embodiments, a vending machine could vend a customized CD or DVD containing the digital content selected by the consumer.

BRIEF DESCRIPTION OF THE DRAWINGS

The following description can be better understood in light of the following Figures, in which.

Together with the following description, the Figures may demonstrate and explain the principles of the apparatus for vending digital content and/or physical products from a vending location and systems containing such apparatus. In the Figures, the thickness and configuration of components may be exaggerated for clarity. The same reference numerals in different drawings represent the same element, and thus their descriptions will not be repeated.

DETAILED DESCRIPTION

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any apparatus, systems, components, and/or techniques conventionally used in the industry. For example, while the systems and methods are described for use with a vending apparatus as a distribution device, the distribution device could include other types of devices, such as kiosks, automated teller machines, coin- or card-operated communications machines (e.g., telephone machines/booths), or remote terminals located in a secure or unsecured public space such as a university, library, hallway, or outdoor vending area.

Figure 1:
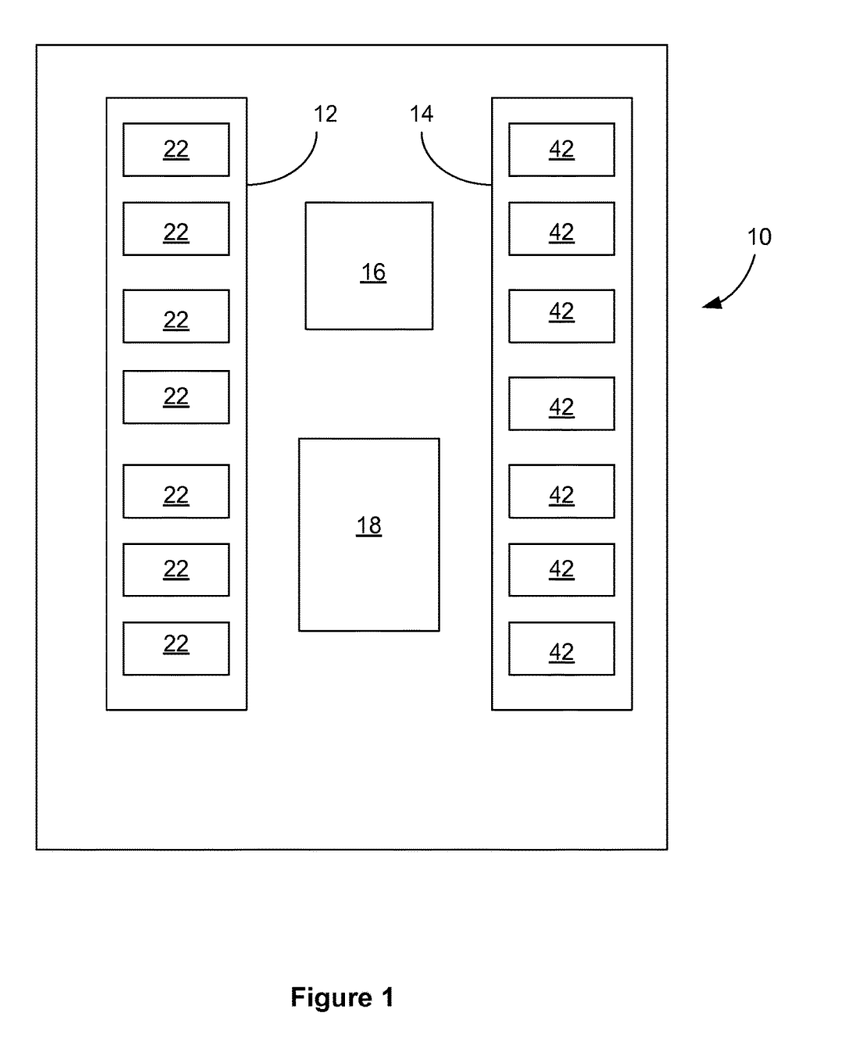
FIG. 1 comprises a schematic illustration of a vending apparatus in some embodiments.

One example of a vending apparatus for distributing physical products and/or digital (or media) content is illustrated in FIG. 1. As shown in FIG. 1, vending apparatus or machine 10 includes storage portions 12 and 14. Each of storage portions 12 and 14 may include one or more compartments 22 and 42. Vending machine 10 also includes user interface 16 and a vending (or dispensing) compartment 18. The vending machine 10 may also contain any other component known in the art, including security devices, coin or bill collectors, credit card readers, or barcode or magnetic chip readers.

Storage portions 12 and 14 may provide storage for any known physical products, whether those physical products are consumable products or electronic products. Examples of consumable products include beverages, snack foods, candy, sandwiches, ice-cream, candy, chips, baked goods, or pre-prepared foods. The types of electronic products can be playback devices or storage devices. Examples of the playback device include portable computers, MP3 players, iPods®, video players, or mobile/cellular phones. Examples of the storage devices include portable computers, mobile/cellular phones, pagers, text messaging devices, calendar or text information devices, recordable media such as memory chips and cards, CDs, DVDs, flash drives, USB sticks, or flash memory storage devices.

Compartments 22 and 42 can store individual items, which may include an individual consumable product, as described above, or an individual electronic product that optionally contains pre-loaded digital content, such as a movie or a song. In some embodiments, the storage portion 12 or 14 for the digital content may be located at a separate location and connected to vending machine 10 either through an electronic network (like the internet), or by some other electronic communication, including wireless communication. Thus, in some embodiments, storage portion 12 may hold beverages and the storage portion 14 may contain a digital content library that resides at the vending machine or at a remote server that, as described herein, is accessible by the vending machine 10.

In some embodiments, one or more of storage portions 12 and 14 may be visible to the consumer for product selection. For example, compartments 22 may be a series of compartments divided from one another and shielded from the consumers by a clear window such as Plexiglas or some similar substance.

The vending machine 10 can contain any combination or number of video displays. The vending machine can also contain multiple input and output devices appropriate to interact with a user, display or perform the digital content, and complete a sales transaction related to the content. These input and output devices may include, for example, one or more of any of the following: a keyboard; a mouse; a trackball; a joystick; a touchscreen; a a label maker; an automatic coupon feeder; a barcode scanner; an image scanner; biometric scanning devices such as a fingerprint, voiceprint, hand geometry, or retinal/iris scanner; a Compact Disc reader; a Compact Disc writer; a video disk reader; a video disk writer; and media device connectivity, including a USB port, an IEEE-1394 FireWire port, a SecureDigital (SD) port, a CompactFlash port, a PCMCIA port, a MemoryStick port, a laser printer, a receipt printer, a video camera, a camera, an audio recorder, a credit/debit/gift card reader, a cash acceptor, a coin acceptor, a check acceptor, a jewel case ejector, a phone docking station, speakers, voice recognition device, signature verifier, facial recognition device, Braille input device, bubble sheet/multiple choice form scanner (such as a Scantron machine), Bluetooth communications, Wi-Fi communications, Wi-Max communications, and other input or output device known in the art. Furthermore, additional input, output, and storage technologies known in the art may be integrated with the vending machine, including any and all mobile or portable devices. In some embodiments, the vending machine also includes any known audio technology, such as speakers or headphones.

The vending machine 10 can include a user-friendly interface 16, including a graphical user interface with a touch screen capability. If desired, multiple interfaces can be incorporated in the vending machine situated at high traffic locations, such as by being positioned on each side of the vending machine. The user interface comprises a hierarchy of pages that a vending machine user navigates through to accomplish different tasks. For example, a user may search for a specific song, title or artist; once the user's selection is found, the selection may be sampled, and eventually purchased. The same process applies to all digital content types where a user can interact with the vending machine to accomplish different tasks associated with the digital content.

The vending machine 10 can also include a controlling device that operates a video display, interacts with input and output devices, and controls external communication with the vending machine. In some aspects, the controlling device includes two or more computers, either sharing or dedicated to the needed tasks requisite to controlling operation. In some aspects, one computer handles the display, selection, and processing of content purchase transactions and a second computer handles the display of advertising messages.

The user (or consumer) interface 16 may also provide a user with choices in selecting physical products and/or digital content from the vending machine 10. The user interface may be part of, or separate from, the components illustrated in FIG. 1. In some embodiments, the user interface 16 may be a touch-screen with various options for purchasing physical products and/or digital content for rental or sale by the vending machine. Thus, it can provide a user interface that presents a visual display of pertinent information during the interaction and distribution processes, as well as operate as a user interface for entry of user commands.

The vending machine 10 may vend, transfer, or distribute the digital content to a user through a number of ways. A consumer may physically couple a storage device or playback device, such as an iPod®, MP3 player, a flash drive, an optical disk, cell phone or other storage means, using an interface cable, such as a USB cable, to the machine to allow download of the content. In addition, or alternatively, the file transfer may be carried out through wireless means such as Bluetooth®, infrared, Wi-Fi, Wi-Max, and other means known in the art. As well, the vending machine may transfer the digital content to an electronic product that can be dispensed to the user, including a storage device, a CD, or a DVD. The digital content may be stored on these devices magnetically, optically, or electronically as well as any other storage mode known in the art. In some aspects, the digital content can be placed on a portable electronic product, along with migrated plug-ins or software that can be used to play the digital content received. The digital content may be pre-loaded onto the device before purchase or the content may be post-loaded on the device after the user has purchased the content.

Figure 2:
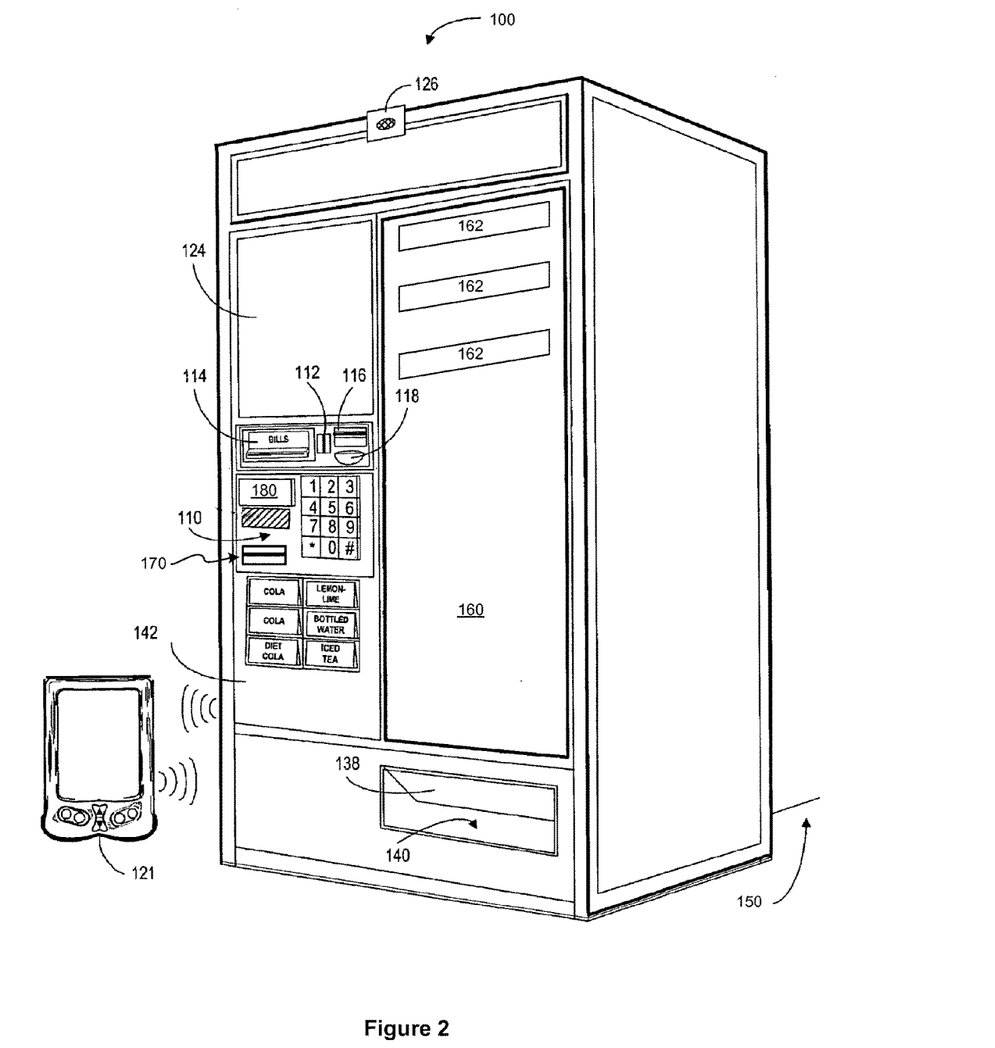
FIG. 2 depicts a vending apparatus in other embodiments.

In other embodiments, the vending machine may be a conventional vending machine for vending consumable goods that has been modified with components sufficient to select and distribute the digital content. One example of these embodiments is shown in FIG. 2. As shown in FIG. 2, vending machine 100 includes a storage portion 160 which may include any number of compartments 162. The vending machine 100 may also include a monitoring device 126 such as a digital camera, video recorder, and/or a microphone. The vending machine 100 may also contain any payment components known in the art, including coin collector 112, bill collector 114, a credit card reader 116, and a change dispenser 118.

Vending machine 100 can also includes an output device 124, an input device 110, and a vending (or dispensing) compartment 140 with an access panel 138. The output device 124 and input device 110 can be installed on a front panel 142 of the vending machine 100. The input device 110 receives input from a user for a product selection, i.e., by using a set of alpha-numeric keys. The input device could also include a selector dial, a set of buttons associated with a respective set of item dispensers, a touch screen, or any other conventional input device. Input device 110 may also be, for example, an infrared (IR) port configured to communicate with a portable electronic device 121, which is illustrated in FIG. 2 as a personal digital assistant (PDA). As described herein, the vending machine 100 may include more than one input device.

The output device 124 of vending machine 100 may be a video display terminal, a liquid crystal display, or a touch screen. Where the output device 124 comprises a touch screen, it can also function as an input device. As described herein, the vending machine 100 may include more than one output device, including speakers or head phones for a user to sample the digital content.

The storage portion 160 may provide storage for any known physical products, whether those physical products are consumable products or electronic products. And the compartments 162 in the storage portion can store individual items, which may include an individual consumable product, as described above, or an individual electronic product that optionally contains pre-loaded digital content, such as a movie or a song. In some embodiments, the vending machine 100 contains an internal storage portion for the digital content. The internal storage portion can be connected internally by a communications link to the input and output devices. As well, the internal storage portion can be connected externally by a wired or wireless communications link 150 to an electronic network (like the internet).

The vending machine 100 can also contains a user interface (typically integrated with the output device 124) that may provide a user with choices in selecting physical products and/or digital content from the vending machine 100. The user interface may be part of, or separate from, the components shown in FIG. 2. In some embodiments, the user interface may be a touch-screen with various options for purchasing physical products and/or digital content for rental or sale by the vending machine.

The user interface also allows the user to purchase products offered for sale or rental through the vending machines. For example, the user interface may include a credit card reading device, cash or coin receiving device, or other payment receiving device known in the art. In some embodiments, a consumer may be able to purchase products wirelessly using third-party money transfer, such as PayPal®, or other similar networked purchasing interfaces. For example, the vending machine may includes a fee collection system for collecting a fee through any one of cash, credit card, smart chip identification, Bluetooth identification, phone identification, swipe-less payment systems such as PayPal, MasterCard's® PayPass, and Motorola's® M-Wallet, and other payment forms of fee collection known in the art. In addition, the vending machine may identify an individual user through biometric markers or other means known in the art.

The vending machine 100 may vend, transfer, or distribute the digital content to a user through a number of ways. A consumer may physically couple a storage device or playback device, such as an iPod®, MP3 player, a flash drive, an optical disk, cell phone or other storage means, using an interface port, such as a USB port 170, to the machine to allow download of the content. In addition, or alternatively, the file transfer may be carried out through wireless means such as Bluetooth®, infrared, Wi-Fi, Wi-Max, and other means known in the art. As well, the vending machine may transfer the digital content to an electronic product (including a storage device, a CD, or a DVD) that can be dispensed to the user through dispensing compartment 140.

The vending machine 100 may contain any combination of dispensing compartments for a user to receive a purchased physical product and/or digital content. For example, the dispensing compartment may comprise a small slot 180 in vending machine 100 that dispenses an SD card with selected media loaded onto the card. In other embodiments, an electronic product (such as a personal media player) that has been purchased can then be loaded with content selected by the user and then dispensed through any slot. In some other embodiments, the dispensing compartment may comprise a larger slot 140, such as for a beverage, as well as a virtual slot, such as wireless component, for sending purchased content to the consumer. For example, if an SD card were purchased, the consumer could conduct the transaction through the user interface. The vending machine 100 would automatically engage the chip, download the desired files onto the chip, and then dispense the chip through, for example, the slit 180 in vending machine 100. In another example, if a CD (or DVD) were purchased, the consumer could conduct the transaction through the user interface. The vending machine 100 would automatically transfer the desired content to the CD (or DVD), and then dispense it through the slit 180 in vending machine 100. Where small devices (such as MicroSD cards) are purchased, an adaptor may be provided on the front of vending machine 100. In some embodiments (such as where a user's portable electronic device may be used), a slot may be provided to give a user a location to insert and extract that device from vending machine 100.

In some embodiments, the vending machines can be part of a system for distributing digital content to a user. The systems contain a first device in a first location where the digital content can be stored and managed and a distribution device (the vending machine) in a second location for delivering the digital content to a user. In some embodiments, the systems can be illustrated by FIG. 3 where the system 5 contains a first (or storage) device in a first location that stores the digital content and can transfers it to a second (or distribution) device in a second location. The digital content can then be distributed from the second device to the user (50).

Prior to discussing the details of system 5, it should be understood that the following description is presented largely in terms of operations that may be performed by conventional computer components. These computer components, which may be grouped in a single location or distributed over a wide area, generally include computer processors, memory storage devices, display devices, input devices, etc. that are known in the art. In circumstances where the computer components are distributed, the computer components are accessible to each other via communication links, such as those illustrated in the Figures. The system 5 could equally operate within a computer system having a fewer or greater number of components than those illustrated in the Figures. Thus, the depiction of system 5 should be taken as illustrative and not limiting. For example, the system 5 could implement various services components and peer-to-peer network configurations to implement at least a portion of the processes.

Figure 3:
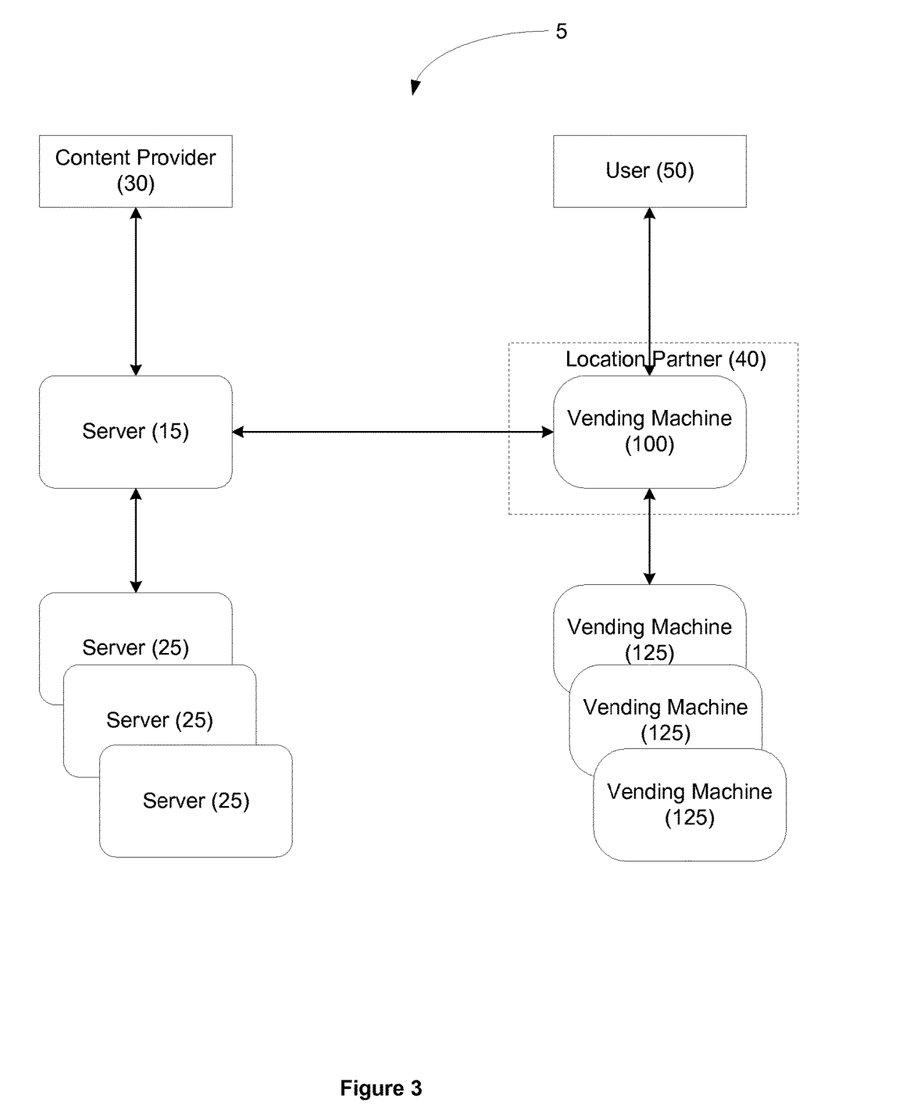
FIG. 3 illustrates a system for delivering digital content to a user of a vending apparatus in some embodiments.

The first location can be located anywhere desired by the operator of the system, i.e., in a central location (with central not referring to the geographic location). The first device can act as a repository for any desired digital content. The first device also permits an operator or administrator of the system 5 to manage all of its operations at a centralized location, permitting roll-out of digital content (and the related materials described herein) across all or select distribution devices and real-time feedback from each distribution device as to its use and functionality.

Any device that can operate in this manner can be used as the first device. One example of the first device comprises a server 15. Any type of server known in the art can be used as server 15. Examples of servers that can be used include a computer running a UNIX-style operating system, a computer running a Microsoft Windows operating system, or a personal computer workstation. The server 15 comprises any storage component on which the digital content can be stored. Examples of storage components include optical storage discs, DVD-RAM discs, and traditional magnetic hard disc drives.

Another example of a storage component includes any known database (or combination of databases). The database stores information regarding the digital content and any user interaction with the system. For example, the database stores data regarding the content inventory at each of the distribution devices. The database can also store sales information, user information, and transactional information. The database may be a Microsoft SQL database, a Microsoft Access database, an Oracle database, a MySQL database or combinations thereof. In some embodiments, the server can contain a database (or module of a database) for managing and monitoring the network of vending machines and a digital content database (or module of a database) for managing and monitoring the digital content.

In some aspects, multiple servers 25 may be connected together to make a server cluster. Using a server cluster permits sharing information regarding the content stored on each server 15 and each transaction the server 15 has recorded. By using a server cluster, the system 5 is always operational, regardless of the location of a particular component on the network that connects the components (such as the Internet). The server cluster can contain a primary cluster, which handles all critical tasks, with minor functions being routed to a secondary cluster. With this configuration, if the primary cluster is not operational, most functions can be handled by the secondary cluster. A server cluster also allows for large-scale deployment and interoperability, as well as data that can be stored on the network in multiple points of co-location.

The software components required for operating the server 15 may be included on a single server or on multiple servers, with each server implementing one or more tasks and communicating among themselves using standard networking protocols. Non-limiting examples of the server-focused tasks using the software components that may be implemented on one or more servers 15 include those of e-mail server; Web server; file server; purchase transaction authentication server; transaction push server; monitoring server; content management server; content synchronization server; content security server; and advertising/promotional message server.

As depicted in FIG. 3, the server 15 manages and stores digital content. The types of digital content that can be stored (and then delivered to a user) are virtually unlimited. Examples of the digital content include music, movies, video games, software, mobile phone ring tones, electronic books, advertising, and other types of content. The format in which the digital content is stored is also virtually unlimited. Examples of the types of digital formats include pdf, doc, xls, jpeg, tiff, gif, xbm, pnm, mpeg2, mpeg4, mp3, oma, m4a, wma, wmv, mov, wav, and avi, as well as combinations thereof. The digital content can also be provided in any known language.

The digital content may be provided internally (by the entity that controls or operates the system 5), or externally by one or more third parties that are the copyright owners of the content or that act on behalf of the owners of the content (collectively, content providers 30). Non-limiting examples of content providers 30 include music publishers, video publishers, recording companies, movie studios, television studios, book publishers, artists, performers, end-users, mobile telephone companies, video game manufacturers, and advertisers. Content providers 30 may provide the content to the server using any known mechanism, including via wired or wireless network connections known in the art or via other methods, such as merely providing a CD or DVD to the operator of the system. In some embodiments, the content providers 30 can provide the digital content to a distribution device(s), which can then be transferred to the server 15.

The digital content can include instructions indicating how the content may be used, distributed, sold, transmitted, or otherwise processed (use instructions). The server 10 can convert such use instructions into digital rights management (DRM) information that can be associated with any desired content. The DRM information may include any number or combination of restrictions, including those that are enabled by a DRM technology and that are selected by a content provider 30. Non-limiting examples of DRM restrictions include a restriction that visual or textual content not be printed in hardcopy; a restriction that copy-and-paste functions are disabled for textual content; a restriction that a music file may not be played after a certain date; a restriction that a music file or video file may only be played a fixed number of times; and a restriction that a file may only be copied to another device a fixed number of times. Other examples include variable pricing, variable billing, and variable payment methods.

The DRM information may be provided by a third party (such as content provider 30 or location partner 40) or by the operator of the system 5. Either may assign a unique transactional ID to each piece of digital content. This unique transactional ID correlates to a set of use instructions and DRM specifications to control how the associated content is managed on devices, such as on the server 15, as further described herein. The digital content may therefore contain metadata (i.e. metatags), use instructions, and a transactional ID.

The metadata (i.e., metatags) can correspond to information about any desired content, such as a genre of music or movie, an artist, a content provider, content release date, or otherwise. The metatags may be provided by a content provider 30 or created by the operator of the system. The metatags may indicate the use instructions for all content that is provided, with distinct use instructions for each piece of content, or with use instructions based on parameters that can be used to classify content. In one example of use instructions, a content provider 30 may indicate that music performed by musical artist A may be redistributed freely, without restriction, music performed by musical artist B may be redistributed freely when purchased at a set price, and music performed by musical artist C may be redistributed in a manner that permits the music to be copied to another computer three times, after which the music may not be copied to another computer, but only played (performed) on a computer where it is stored.

The digital content may optionally be encrypted in a manner to increase security of the content during storage on a server 15 or on a distribution device, or during transfer between a content provider 30 and a server 15, or between a server 15 and the distribution device. Any number of encryption methods known to those in the art may be used to implement this feature. Examples of such encryptions include both symmetrical and asymmetrical encryption using a variety of methods, including RSA, DES, Triple DES, AES, Blowfish, ElGamal, RC4, and others.

When the distribution device is placed in a location that is remote from the first device, a location partner 40 can optionally be used in the system 5, as depicted in FIG. 3. The location partner 40 comprises an individual or entity that provides a space where the distribution device (i.e., the vendhin machine) may be physically located. Non-limiting examples of such location partners include owners, operators or managers of airports, bars, clubs, schools, universities gyms, stadiums, arenas, amusement parks, military bases, retail centers, retail stores or shops, convenience stores, eating establishments, correctional facilities, passenger ships, military ships, travel centers or stops, and libraries.

A location partner 40 may provide this space without charge, as a service to individuals that visit the space where the distribution device is placed. Or the location partner 40 may provide this space in exchange for a fee of some type, or in exchange for advertising time on the distribution device, or for any other known benefit. In some embodiments, the location partner 40 may control or limit the content that is available via the distribution device. In other embodiments, the location partner can also control the advertising that is displayed at the distribution device.

As described above, the system also contains a distribution device that can be located in a second location that is optionally remote from the first location. The distribution device receives the content from the first or storage device and then distributes that content to a user of the distribution device. Any device operating in this manner can be used as the distribution device. In some embodiments, the distribution device comprises the vending machines depicted in FIGS. 1 and/or 2.

The vending machines provide a point-of-sale (or rental) experience for any user, including both actual and merely potential purchasers of the digital content. Any person can be a user by merely interacting with the vending machine, whether by purchasing content or merely viewing the vending machine and/or the content on the vending machine, such as by sampling music contained in the vending machine. In some embodiments, the system 5 can contain a network of vending machines 125.

The various components of the system 5 can be electronically connected to each other using any means known in the art. In some embodiments, the system 5 contains a computer network. Computer networks are well known in the field of communications. Computer networks may include communication links that extend over a local area or a wide area, or even be global. Examples of these connections include Ethernet, frame relay, DSL, satellite uplink, cable modem, analog modem, fiber channel, infrared and microwave transmissions, wireless communications of various types, and other wired or wireless networking technologies known in the art. Such connections may also be constructed through a publicly accessible network, such as the internet, so long as appropriate security measures, as are known in the art, are used to prevent unauthorized access to the content that passes across the connection. A private network connection may also be used in order to reduce the reliance on such security measures and to further ensure the integrity of content that is transferred via this connection.

The various components of the system are able to communicate with each other whenever needed. In some embodiments, the server and any given vending machine may communicate at regular or scheduled intervals, in real-time, or in an ad hoc manner according to needs that arise as determined by the server or the vending machine. Since actual real-time communication may be limited by the transmission speeds available, the communication may be on a substantial or near real-time basis.

In some embodiments, the various components of the system need not be electronically connected. For example, the vending machine need not be connected to the server on a continuous basis. Rather, the vending machine can operate in a stand-alone mode, with digital content being transferred to the vending machine via non-networked means, and purchase transactions and data being collected via non-networked, intermittent means. A stand-alone vending machine can be used, for example, when security procedures and/or network connectivity are not available, such as when a vending machine is located on a military base in a different country than the server 15 from which it would otherwise receive content.

The systems described above can be used to transfer the digital content from the first device to the distribution device, where it then can be optionally distributed to a user. While the digital content can be transferred by the system in any manner, in some aspects, it can be transferred in a semi-dynamic manner, dynamic, or even static manner. The digital content can also be transferred to any distribution device (or group of devices) at once or one device at a time. The manner in which the digital content is transferred between distribution devices can be controlled by the server that disseminates this information to each distribution device. All aspects of digital content transfers can be controlled, including controlling the times of day for transfers, the upload and download bandwidth of the distribution device, and the content availability.

Using the vending machines and systems described herein, a user may select from available digital content at the vending machine and then obtain a copy of the digital media or content. This may be done by obtaining an audio CD or DVD containing the content; the digital content may also be downloaded to a device (whether a dispensable electronic product in the vending machine or a portable electronic device provided by the user), including a portable music player or a portable storage device, including a USB-based solid state storage device, Compact Flash, Secure Digital card, Memory Stick, or other similar devices having the ability to store the digital content. The digital content may then be played directly from an audio CD, DVD, or other formatted storage media; may be played directly on the device to which the digital content was transferred; or may be copied from the device to the user's personal computer or other electronic devices as desired. In some instances, the digital content could also be transferred wirelessly by any wireless communication (i.e., SMS) to any electronic device (i.e., a cell phone).

In some embodiments, the consumer may be able to select a desired physical product (i.e., a beverage) and simultaneously download a song or other digital product onto a portable electronic device carried by the consumer. In other embodiments, the content offered may be a single audio file selected to be distributed with a particular beverage or food product. In yet other embodiments, a consumer may be able to create a personal mix of content from a content library for download onto a device carried by the user while enjoying a beverage or food product dispensed from vending machine. In other embodiments, the user interface may include a wireless interface, such as a blue-tooth interface allowing the consumer to select products, including a beverage and/or food, and content using their own electronic device.

The content of the vending machine may be adapted through mechanically changing the storage device within the machine, such as storage portion 140, downloading new files to the storage device located within the machine via on site transfer, including wireless transfer, transferring content to the storage device located within the machine via electronic communication with the system 5.

In some embodiments, several vending machines may be networked together to act as distribution nodes in a distribution chain. In some instances, one vending machine may act as the server in the system. In addition, networked vending machines may provide advantages commonly known with such a network including increased processing speed, increased storage and shared storage.

The vending machines may also vend or offer additional services including services allowing an upload data for transfer to an electronic product that can be purchased at the vending machine. For example, a vending machine may allow a consumer's camera full of pictures to upload the pictures stored on the camera, purchase a storage device and download the pictures to the storage device.

In another example, the vending machine may vend files downloaded to the machine from a specific source and intended for a specific source. For example, where a traveling salesman needs a particular file from his home office and he does not have access to the internet, the traveler may visit the vending machine and then purchase a storage device containing the file transferred from the home office to that particular vending machine.

The vending machines and the systems containing them can be configured to communicate with—and therefore be accessed—at locations other than a vending machine. In these embodiments, the location of any given vending machine and both the physical products and the digital content available at that particular vending machine can be accessed via a portal (such as a Web site) that is in communication with the system and/or vending machine. Thus, a user can browse, select, and pay for any desired physical product and/or digital content using this portal when the user is not located at the vending machine. After a verification process when the user arrives at that vending machine, the user is then able to retrieve the purchased physical product and/or digital content. In some instances, the user could make payment via the portal after the user has retrieved the physical product and/or digital content.

In similar embodiments, the payment for the digital content could be made while the user is located at the vending machine, but the digital content can be delivered in another location. Thus, for example, the user can purchase in one location and retrieve the digital content in another location. These other locations include another vending machine (i.e., if the original vending machine does not contain the desired physical product), a vending machine at another desired location (such as in a retail location), or even an electronic device at another location, such as a desktop computer located at the user's home or office.

As another example, a user could interact with a server using a Web page embodiment and then select a separate vending machine having a CD-burning output device as the delivery location. As yet another example, a user could interact with a server via a first vending machine having two video displays and a CD burner, but then discover that the preferred device for receiving the content, an audio CD, was unavailable because all blank audio CDs at that particular location had been used. The user could then select as the delivery location a vending machine (or even a kiosk) located in another building on the same campus where blank audio-CDs were available, or the user could select a Web page embodiment as the delivery location and a download to a hard disk as the electronic device.

In still another variation on the systems and methods described above, multiple vending machines 125 may be linked in a manner such that purchases are completed on one or more vending machines but the delivery location for all such purchases is a designated vending machines that is located separately. As one example, a retail establishment could maintain multiple vending machines at which customers could browse available content. After purchase of content through any of those vending machines, all users would collect an audio CD, DVD video disk, or other device from a separate kiosk that was designed for high-volume generation of such devices.

In other embodiments, the browsing and selection processes can be performed by mail order (i.e., using a catalog) or at a retail location. The location for delivery at a particular vending machine can also be selected during this process. For example, a user can select and optionally purchase a digital camera at a retail location (or using a catalog of the retailer). At the appropriate time during the selection, the user can select the desired location for delivery, i.e., a vending machine located at the front of the retail store (or even the user's home or office). After a verification process when the user arrives at that vending machine, and after payment is made (if necessary), the user is then able to retrieve the purchased digital camera and/or digital content.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A vending apparatus, comprising:
    a viewable storage portion configured to store a plurality of physical products including a consumable food product and a plurality of dispensable electronic products, wherein the plurality of dispensable electronic products comprises a playback device;

an internal storage portion configured to store digital content;

a third portion configured to dispense the physical product, the digital content, or both to a user, wherein the third portion comprises a first part for dispensing the physical product and a second part for distributing the digital content;

a user interface for displaying the digital content and for allowing a user to select desired digital content; and a communications link configured to transfer the selected digital content from another vending apparatus;

wherein the digital content is transferred to the playback device located within the viewable storage portion and the playback device is subsequently dispensed to the user.

2. A system for delivering digital content to a user, comprising:

a storage device selected by a user and capable of storing digital content at a first location;

a distribution device capable of distributing the digital content to a user of the distribution device at a second remote location, the distribution device containing:

a viewable storage portion configured to store multiple physical products including a plurality of dispensable electronic products, and configured to display the stored multiple physical products, wherein the plurality of dispensable electronic products includes playback devices;

an internal storage portion configured to store digital content;

a third portion configured to dispense a playback device and the digital content to a user, wherein the digital content is transferred to the playback device located within the viewable storage portion, and the playback device is subsequently dispensed to the user;

a user interface for displaying the digital content and for allowing a user to select desired digital content; and a communications link configured to transfer the selected digital content to a selected, dispensable electronic product from among the plurality of dispensable electronic products; and a communications network connecting the storage device and the distribution device.

* * * * *